(12) United States Patent
Herrmann et al.

(10) Patent No.: US 10,215,280 B2
(45) Date of Patent: Feb. 26, 2019

(54) HYDRAULIC SYSTEM OF AN AUTOMATIC TRANSMISSION WITH MULTIPLE VALVE DEVICES

(71) Applicant: ZF Friedrichshafen AG, Friedrichshafen (DE)

(72) Inventors: Markus Herrmann, Scheidegg (DE); Thilo Schmidt, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 363 days.

(21) Appl. No.: 15/185,686

(22) Filed: Jun. 17, 2016

(65) Prior Publication Data
US 2016/0369893 A1 Dec. 22, 2016

(30) Foreign Application Priority Data
Jun. 19, 2015 (DE) .......................... 10 2015 211 298

(51) Int. Cl.
| | |
|---|---|
| B60T 1/00 | (2006.01) |
| B60T 1/06 | (2006.01) |
| F16D 63/00 | (2006.01) |
| F16H 61/12 | (2010.01) |
| F16H 63/34 | (2006.01) |

(52) U.S. Cl.
CPC .......... F16H 63/3483 (2013.01); B60T 1/005 (2013.01); B60T 1/062 (2013.01); F16D 63/006 (2013.01); F16H 61/12 (2013.01); F16H 2061/1252 (2013.01)

(58) Field of Classification Search
CPC .. F16H 61/0206; F16H 61/1252; F16H 63/34; F16H 63/3416; F16H 63/3483; F16H 2061/1252; B60T 1/062; B60T 1/005

USPC ........................................... 192/219.4, 219.5
See application file for complete search history.

(56) References Cited

U.S. PATENT DOCUMENTS

| | | |
|---|---|---|
| 8,944,232 B2 | 2/2015 | Schmidt et al. |
| 8,991,276 B2 | 3/2015 | Herrmann et al. |
| (Continued) | | |

FOREIGN PATENT DOCUMENTS

| | | |
|---|---|---|
| DE | 102010028759 A1 | 11/2011 |
| DE | 102011079850 A1 | 1/2013 |
| (Continued) | | |

OTHER PUBLICATIONS

German Search Report DE102015211298.5 dated May 16, 2017. (10 pages).

Primary Examiner — Richard M Lorence
(74) Attorney, Agent, or Firm — Dority & Manning, P.A.

(57) ABSTRACT

A hydraulic system for an automatic transmission a valve slide longitudinally adjustable in a valve housing between a first axial position and a second axial position such that a plurality of valve seat pockets are selectively brought into operative connection with each other. A control surface of the valve slide, first and second additional control surface of the valve slide and a spring of a parking brake valve are matched to one another such that the total actuating force applied to the slide valve displaces the slide valve to the first axial position when an actuating pressure of the parking brake unit, a pressure signal at the control surface of the valve slide and an additional pressure signal at the second additional control surface of the valve slide are applied.

11 Claims, 5 Drawing Sheets

(56) References Cited

U.S. PATENT DOCUMENTS

| | | | | |
|---|---|---|---|---|
| 2009/0071275 A1* | 3/2009 | Yoshioka | ................ | B60T 1/005 |
| | | | | 74/335 |
| 2013/0174722 A1* | 7/2013 | Schmidt | .............. | F16H 61/0206 |
| | | | | 91/45 |
| 2014/0110216 A1* | 4/2014 | Pollack | ............... | F16H 63/3483 |
| | | | | 192/219.4 |
| 2016/0334015 A1* | 11/2016 | Ichikawa | ............ | F16H 63/3483 |

FOREIGN PATENT DOCUMENTS

| | | |
|---|---|---|
| DE | 102012200202 A1 | 7/2013 |
| WO | WO 2011/138103 | 11/2011 |

\* cited by examiner

HYDRAULIC SYSTEM OF AN AUTOMATIC TRANSMISSION WITH MULTIPLE VALVE DEVICES

FIELD OF THE INVENTION

The invention relates generally to a hydraulic system of an automatic transmission with multiple valve devices.

BACKGROUND

A hydraulic system for actuating at least one shift element of a transmission is known from DE 10 2011 079 850 A1. The hydraulic system is formed with multiple valve devices and a hydraulically actuated parking brake unit. One of the valve devices is a parking brake valve with multiple valve seat pockets formed in the area of a valve housing, through which an actuating pressure of the parking brake unit that exists as a function of a supply pressure can be applied to it. The valve seat pockets can be brought into operative connection with each other or are separable from each other by a valve slide that is longitudinally adjustable in the valve housing. The valve slide is spring-loaded in the direction of a first axial position corresponding with a first operating state of the parking brake valve, in which actuating pressure is applied at the parking brake unit, at which the parking brake is transferred into the engaged operating state. In the area of a control surface of the valve slide, a pressure signal acting in the direction of a second axial position of the valve slide corresponding with a second operating state of the parking brake valve is connectable, in which, at the parking brake unit, an actuating pressure transferring a parking brake of the parking brake unit into the disengaged operating state can be applied.

The pressure signal that can be applied to the control surface of the valve slide is adjusted in the area of an electrically actuated pressure regulating device, whereas the pressure regulator features a so-called "rising characteristic." This means that, with an increasing actuating current, the pressure outputted in the area of the pressure control device or the value of the pressure signal that can be applied in the area of the control surface increases. With a loss of the power supply of the hydraulic system, this design of the known hydraulic system leads to the fact that the pressure signal drops to the value of zero and the valve slide of the parking brake valve is transferred into the first axial position and the parking brake attempts to move into the engaged operating state.

Above a defined rotational speed of a parking interlock gear, in which a parking pawl then attempts to come in, the coming in of the parking pawl is avoided by a corresponding structural design of the parking interlock gear and the parking pawl, which are each designed with a correspondingly repelling contour. However, above the defined rotational speed, this structural configuration that avoids the coming in of the parking brake leads to so-called "ratchets" between the parking pawl not coming into the parking interlock gear and the parking interlock gear, whereas the parking pawl and/or the parking interlock gear suffer irreversible damages when there are long-persisting ratchets.

In order to prevent damages in the area of the parking brake unit, the hydraulic system is designed with a so-called "emergency gear concept," which is automatically activated upon a loss of the power supply. During the activated hydraulic emergency run concept, in an automatic transmission featuring the hydraulic system, depending on the operating state, so-called "emergency gear transmission ratios" are engaged, for the presentation of which one of the two shift elements is switched on or closed by applying a corresponding actuating pressure. The respective lines subjecting the shift elements to actuating pressure are in operative connection with each other through a so-called "ball shuttle valve." Through the ball shuttle valve, it is ensured that, in each case, the higher actuating pressure of the two shift elements provided for the presentation of the emergency gear is forwarded in the direction of the parking brake valve and is applied there in the area of a further control surface. From the actuating pressure, applied at the further control surface of the valve slide of the parking brake valve, of one of the two shift elements switched on for the presentation of the emergency gear, an actuating force acting on the valve slide results, which transfers the valve slide into its second axial position or hold it in this, in order to hold the parking brake in the disengaged operating state.

The emergency gear functionality described above of the known hydraulic system is characterized by a high design effort in the area of the hydraulic shift device and therefore causes high production costs.

SUMMARY OF THE INVENTION

As such, exemplary aspects of the present invention provide a structurally simple and cost-effective hydraulic system of an automatic transmission, by which loads in the area of a parking brake unit can be reduced to a minimum even upon the loss of function of the electrical supply of the hydraulic system.

The hydraulic system in accordance with exemplary aspects of the invention of an automatic transmission is formed with multiple valve devices and with a hydraulically actuated parking brake unit. One of the valve devices is a parking brake valve with multiple valve seat pockets designed in the area of a valve housing. Through the parking brake valve, an actuating pressure of the parking brake unit that exists as a function of a supply pressure can be applied to it. The valve seat pockets can be brought into operative connection with each other or are separable from each other by a valve slide that is longitudinally adjustable in the valve housing. The valve slide is spring-loaded in the direction of a first axial position corresponding with a first operating state of the parking brake valve, in which actuating pressure is applied at the parking brake unit, at which the parking brake is transferred into the engaged operating state. In addition, in the area of a control surface of the valve slide, a pressure signal acting in the direction of a second axial position of the valve slide corresponding with a second operating state of the parking brake valve is connectable, in which, at the parking brake unit, an actuating pressure transferring a parking brake of the parking brake unit into the disengaged operating state can be applied.

In accordance with exemplary aspects of the invention, the actuating pressure of the parking brake unit is also applied at a further control surface of the valve slide. The actuating force resulting from this and acting on the valve slide acts in the direction of the second axial position, while, in the area of an additional control surface of the valve slide, an additional pressure signal can be applied, which engages in the direction of the first axial position of the valve slide on this. The control surfaces and the spring device are matched to one another in such a manner that, upon pressures at the valve slide applied in the area of the control surfaces and corresponding to each other, an overall force component displacing the valve slide into its first axial position engages.

The valve slide of the parking brake valve of the hydraulic system in accordance with the exemplary aspects of invention is, in a disengaged operating state of the parking brake of the parking brake unit, in the direction of the second axial position, subjected to the actuating pressure of the parking brake unit, by which the parking brake valve is held against a return spring of the parking brake valve with a so-called "self-retaining." It is thereby ensured that, upon a triggered emergency run, for example upon a loss of the power supply, the parking brake is hydraulically held in the disengaged operating state, as long as the applied supply pressure or system pressure, as the case may be, of the hydraulic system is applied above a defined threshold.

Upon a loss of the supply pressure, the actuating pressure of the parking brake unit is also lowered and the self-retaining of the parking brake valve is lost. Below a defined actuating pressure, the parking brake of the parking brake unit is transferred into the engaged operating state, by which the system assumes a so-called "secure operating state."

Through the additional pressure signal applied in the area of the additional control surface of the valve slide, in the normal mode of the hydraulic system, an active engagement of the parking brake is ensured at all times, whereas, with a corresponding engagement of the parking brake valve in the event of an error, the pressure signal applied in the area of the control surface, which acts on the valve slide in the direction of the second axial position, can be overpressurized.

Thus, through the hydraulic system in accordance with exemplary aspects of the invention, an undesirable engagement of the parking brake is avoidable in a structurally simple and cost-effective manner, even without an emergency gear concept known from the state of the art, as long as the supply pressure is greater than a defined threshold value.

If the pressure signal is adjustable in the area of one of the valve devices, which is formed as an electrically actuated pressure regulator and in the area of which the pressure signal increases with an increasing actuating current, above the defined threshold value of the supply pressure, it is ensured that the parking brake is held by the self-retaining of the parking brake valve in a disengaged operating state and, with a pressure drop of the supply pressure below the defined threshold value or equal to the threshold value, the parking brake transfers into the engaged operating state when there is a simultaneous loss of the power supply, since, at that point, the pressure signal in the area of the electrically actuated pressure regulator essentially drops to zero and, at the valve slide of the parking brake valve, a control force that can be overpressurized by the return spring and acts in the direction of the second axial position of the valve slide is applied.

With one embodiment of the hydraulic system in accordance with exemplary aspects of the invention that is favorable for installation space and costs, the pressure signal of the pressure regulator can also be used for the adjustment of an actuating pressure, which exists depending on the supply pressure, of at least one shift element of the automatic transmission.

If the additional pressure signal is adjustable in the area of a valve device, which is formed as an electrically actuated pressure regulator and in the area of which the pressure signal increases with an increasing actuating current, it is in turn ensured that the valve slide of the parking brake valve, upon a loss of the power supply, only upon a drop in the supply pressure under the defined threshold at which the self-retaining of the parking brake valve is lost, is transferred into an operating state, at which the parking brake assumes the engaged operating state.

If one of the valve seat pockets constitutes a supply pressure relief valve seat pocket, at which the supply pressure can be applied and which is in connection with an additional seat pocket at least in the first axial position of the valve slide of the parking brake valve, which seat pocket is coupled as a vent valve seat pocket with a low-pressure area, the hydraulic system can be operated with a desired high degree of spontaneity, since the pressure applied in the area of the supply pressure valve seat pockets can be degraded in the first axial position of the valve slide to the desired extent by the vent valve seat pocket.

With an additional advantageous embodiment of the hydraulic system in accordance with exemplary aspects of the invention, one of the valve seat pockets constitutes an actuating pressure valve seat pocket, in the area of which the actuating pressure applies, through which the parking brake valve is connected to the parking brake unit and which is in connection with an additional seat pocket at least in the first axial position of the valve slide of the parking brake valve, which seat pocket is coupled as a vent valve seat pocket with a low-pressure area. This in turn leads to the fact that the actuating pressure valve seat pocket is vented in the first axial position of the valve slide to the desired extent in the direction of the low-pressure area and the pressure in the area of the actuating pressure valve seat pocket is degraded to the desired extent within short operating periods, and an impairment in the actuation of the parking brake valve is avoided by the actuating pressure applied in the area of the actuating pressure valve seat pocket.

If the supply pressure valve seat pocket is connected to the actuating pressure valve seat pocket at least in the second axial position of the valve slide of the parking brake valve, and the connection between the supply pressure valve seat pocket and the vent seat pocket as well as between the actuating pressure valve seat pocket and the vent valve seat pocket is disconnected, the parking brake unit in the second axial position of the valve slide is subjected, to the desired extent, with the actuating pressure required for disengaging the parking brake or for holding the parking brake in a disengaged operating state.

With a structurally simple additional form of the hydraulic system in accordance with exemplary aspects of the invention, the actuating pressure applies by one of the valve seat pockets at the further control surface of the valve slide.

With an embodiment of the hydraulic system in accordance with exemplary aspects of the invention that is favorable for installation space and is structurally simple, the further control surface corresponds to a differential surface between two control surfaces turned towards each other of the valve slide of the parking brake valve, whereas the actuating pressure is applied at the further control surface in the area of the actuating pressure valve seat pocket.

With an embodiment of the hydraulic system in accordance with exemplary aspects of the invention that is disengageable with higher degrees of freedom, the valve slide of the parking brake valve comprises two separate valve slide parts, which are spaced from each other in an axial direction and are arranged in the housing in a manner longitudinally movable relative to each other, and between which the spring device is arranged. The control surface and the further control surface are provided in the area of the first valve slide part, and the additional control surface is provided in the area of the second valve slide part. The actuating pressure valve seat pocket and the supply pressure valve seat pocket are separated from each other in the first axial position of the first valve slide part and are each connected to the allocated vent valve seat pocket, while the actuating pressure valve seat pocket and the supply pressure valve seat pocket are connected to each other in the second axial position of the first valve slide part and are each separated by the allocated vent valve seat pocket, and the first valve slide part can be transferred by the second valve slide part into its first axial position.

With this embodiment of the hydraulic system in accordance with exemplary aspects of the invention, the additional control surface can be disengaged in the area of the second valve slide part to the desired extent, regardless of the diameter of the first valve slide part, which determines the size of the control surface and the further control surface. Thereby, the actuating force that is transferred to the parking brake valve into the first axial position and results from the additional pressure signal can be provided in such a manner the parking brake valve in any event can be transferred by the return spring and the additional pressure signal into the first axial position of the valve slide.

With a structurally simple embodiment of the hydraulic system in accordance with exemplary aspects of the invention, the second valve slide part is spring-loaded by the spring device in the direction of a stop, and is adjustable by an additional pressure signal against the spring force of the spring device in the direction of the first valve slide part.

Both the characteristics specified in the claims and the characteristics specified in the subsequent embodiments of the hydraulic system in accordance with the invention are, by themselves alone or in any combination with one another, suitable for providing additional forms for the object in accordance with the invention.

Additional advantages and advantageous embodiments of the hydraulic system in accordance with the invention arise from the claims and the embodiments described below, with reference to the drawing in terms of principle, whereas, for the benefit of clarity in the following description, the same reference signs are used for structurally and functionally identical components.

BRIEF DESCRIPTION OF THE DRAWINGS

The following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
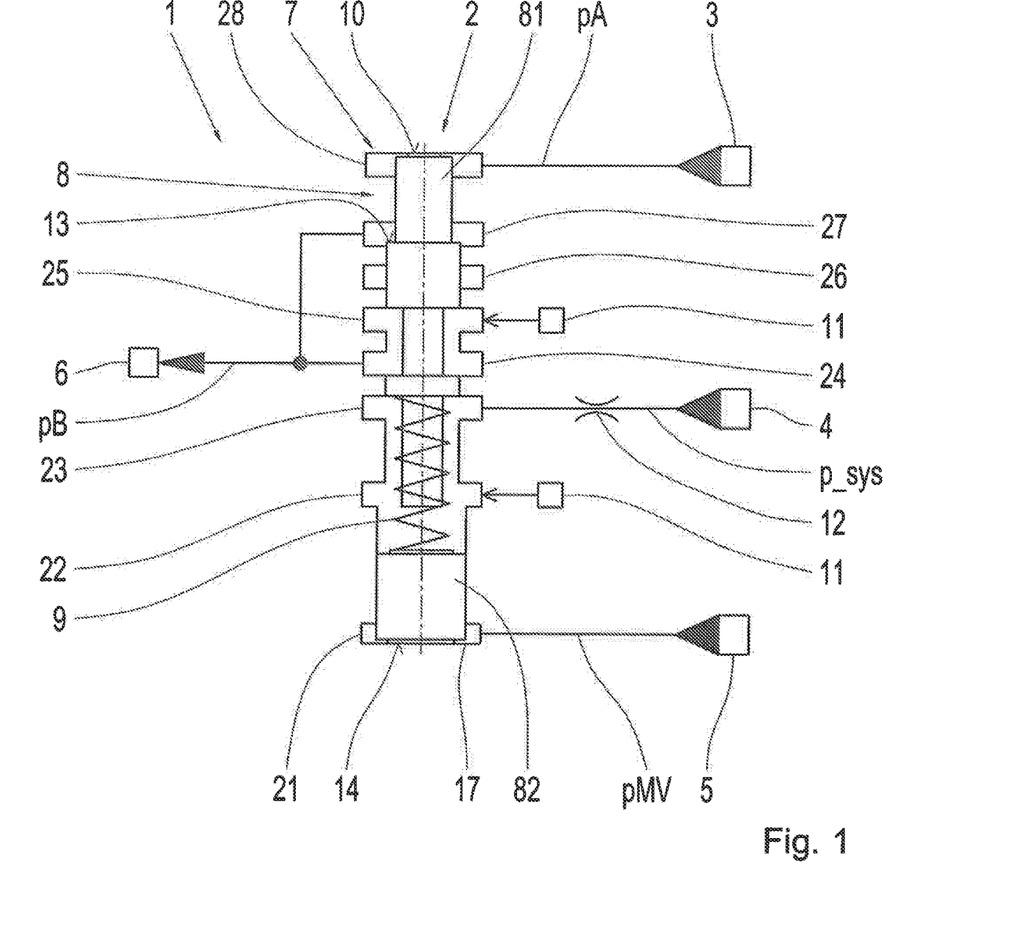
FIG. 1 a first embodiment of a parking brake valve in the hydraulic system in accordance with exemplary aspects of the invention, whereas a valve slide of the parking brake valve is in a first axial position.

FIG. 1 shows a part of a hydraulic system 1 of an automatic transmission, which comprises multiple valve devices 2 through 5 and a hydraulically actuated parking brake unit 6. One of the valve devices 2 is a parking brake valve with multiple valve seat pockets 21 through 28 formed in the area of a valve housing 7, through which an actuating pressure pB of the parking brake unit 6 that exists as a function of a supply pressure or a system pressure p_sys, as the case may be, can be applied to it. In the present case, the system pressure p_sys is adjustable in the area of a valve device 4 constituting a system pressure valve. Thereby, the feed pressure of a hydraulic pump of the automatic transmission applies at the system pressure valve 4 and is adjusted, depending on the operating state, as a function of a pilot pressure applying at the system pressure valve. The pilot pressure of the system pressure valve 4 is in turn adjusted in the area of a valve device that is designed as an electric pressure regulator and is not shown in the drawing, whereas, upon the loss of the electrical supply, the system pressure p_sys essentially equally corresponds to the feed pressure of the hydraulic pump and in each case assumes the maximum value. In the manner more specifically described below, the valve seat pockets can be brought into operative connection or are separable from each other through valve slides 8 that are longitudinally adjustable in the valve housing.

Figure 2:
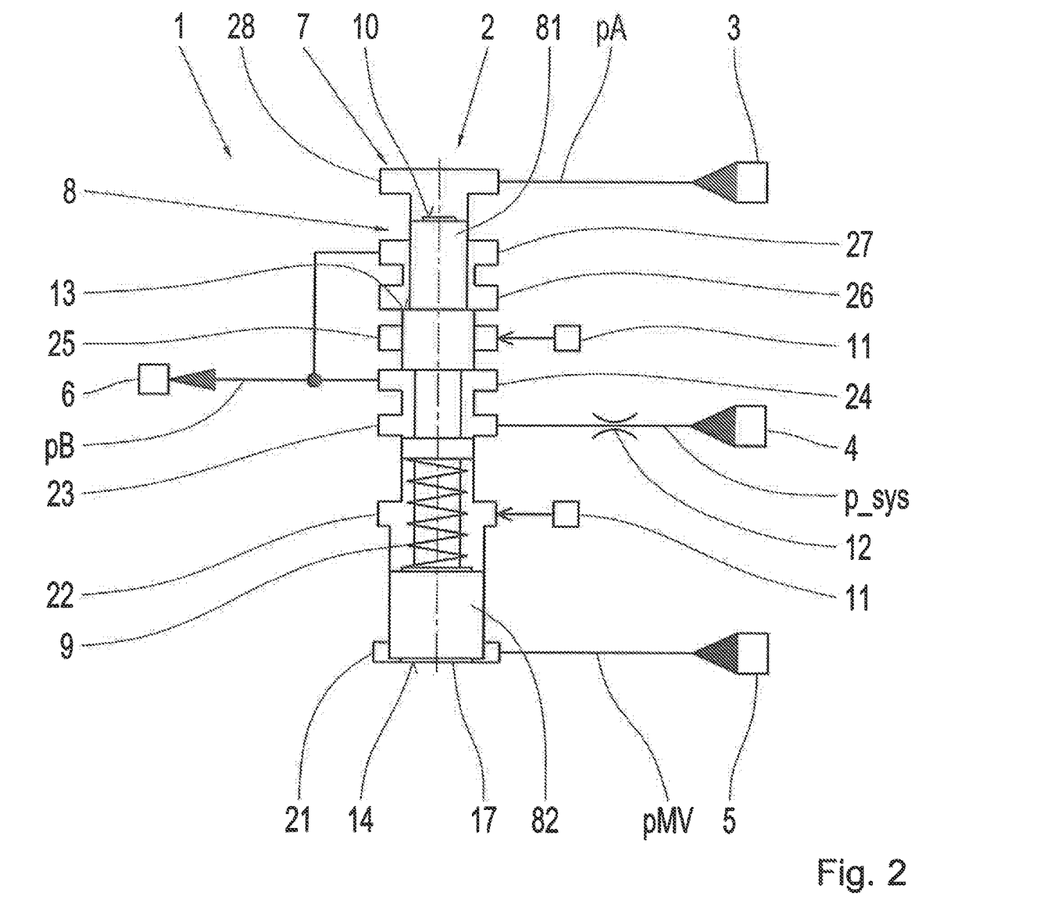
FIG. 2 a view of the exemplary parking brake valve corresponding to FIG. 1, the valve slide of which is in a second axial position.
Figure 3:
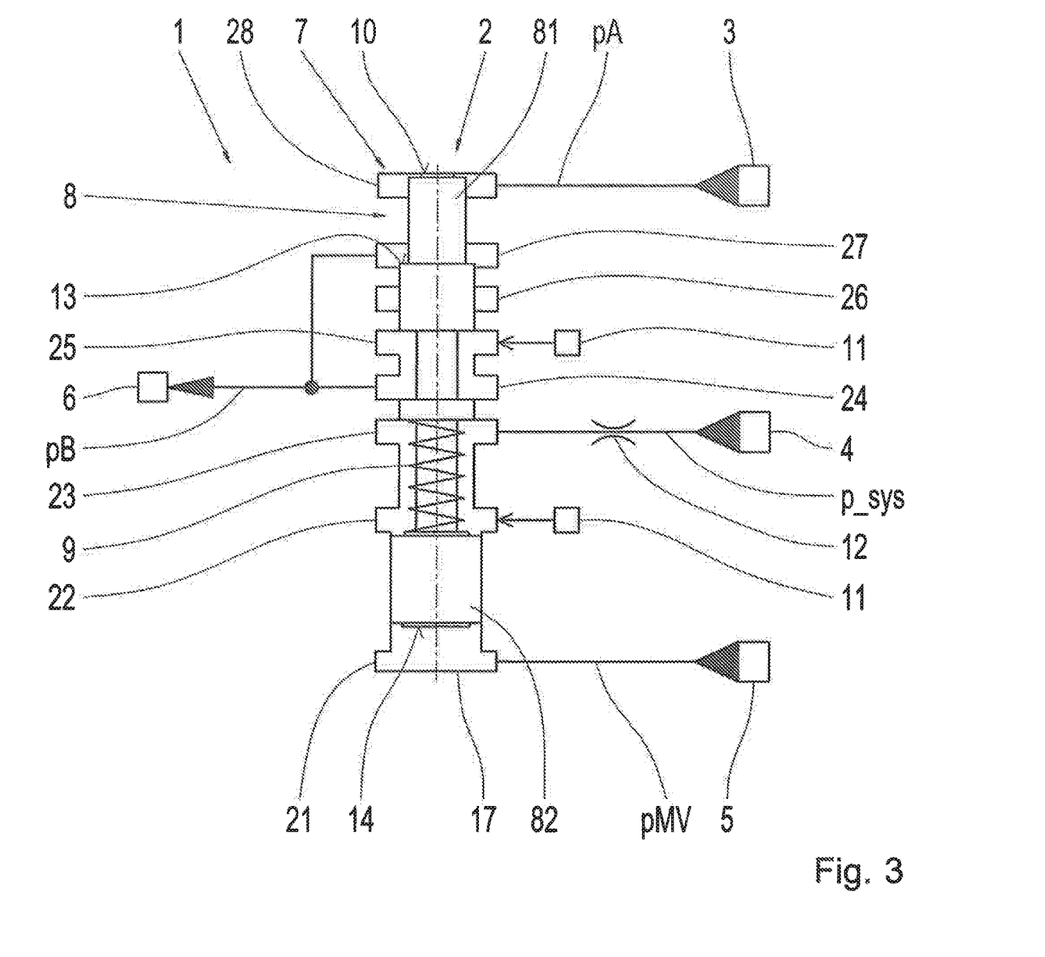
FIG. 3 the exemplary parking brake valve in accordance with FIG. 1, whereas the valve slide is in turn in the first axial position.

With the first exemplary embodiment of the parking brake valve 2 shown in FIG. 1 through FIG. 3, the valve slide 8 of the parking brake valve 2 comprises two separate valve slide pieces 81, 82, which are spaced from each other in an axial direction and are arranged in the valve housing 7 in a manner longitudinally movable relative to each other.

Figure 4:
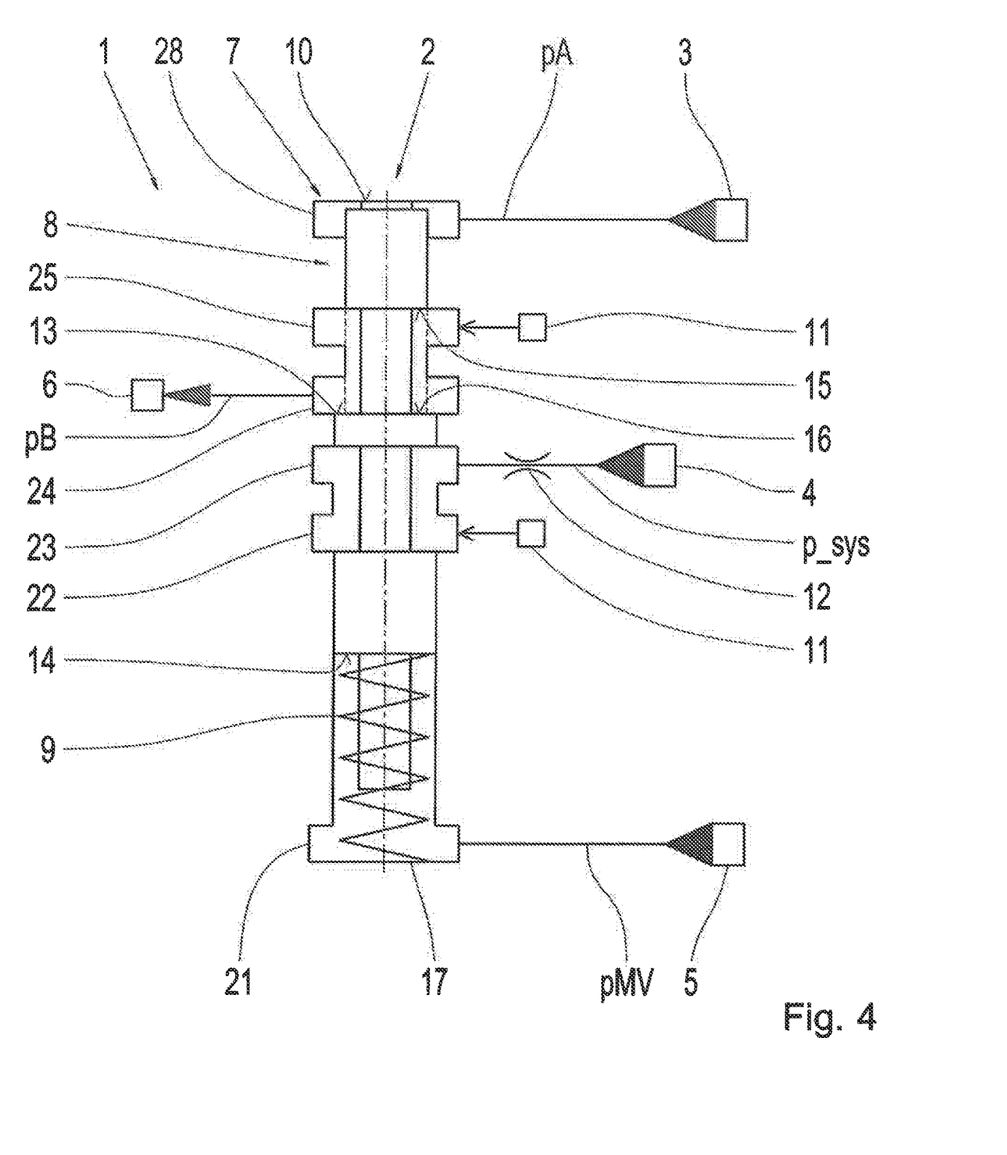
FIG. 4 a second embodiment of the parking brake valve of the hydraulic system in accordance with exemplary aspects of the invention, the valve slide of which is arranged in the first axial position.
Figure 5:
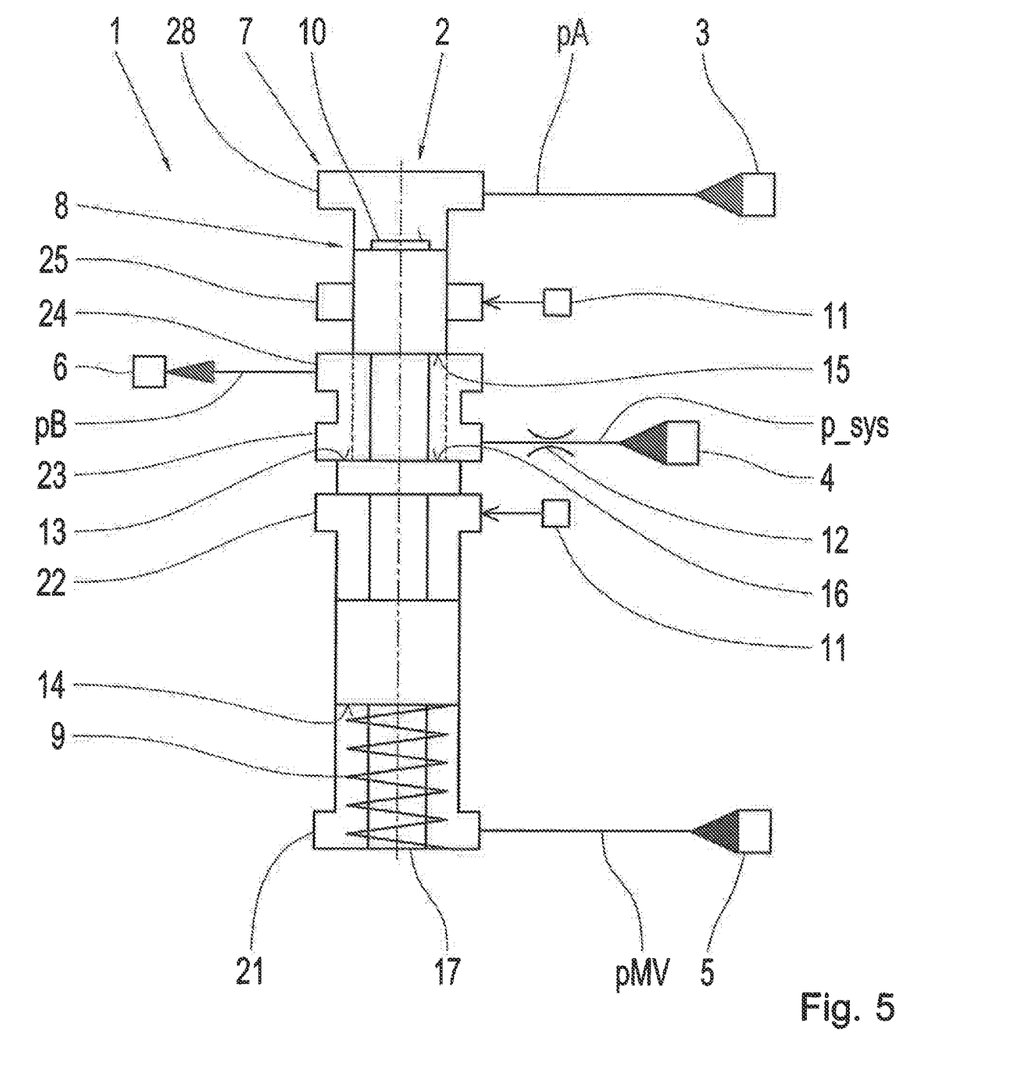
FIG. 5 the exemplary parking brake valve in accordance with FIG. 4, whereas the valve slide is pushed into its second axial position.

In contrast to this, the valve slide 8 of the parking brake valve 2 in accordance with FIG. 4 and FIG. 5 is formed in one piece, whereas the first valve slide part 81 of the parking brake valve 1 in accordance with FIG. 1 through FIG. 3 and the one-piece valve slide 8 of the parking brake valve 2 in accordance with FIG. 4 and FIG. 5 have essentially the same functionality and mode of action, while the second valve slide part 82 is provided only for the actuation of the first valve slide part 81, starting from a second axial position of the first valve slide part 81 shown in FIG. 2, in the direction of the first axial position shown in FIG. 1 or FIG. 3, as the case may be.

This means that the valve seat pockets 21 through 28 of the parking brake valve 2 in accordance with FIG. 1 through FIG. 3 and the valve seat pocket 21 through 25 and the valve seat pocket 28 of the parking brake valve 2 in accordance with FIG. 4 and FIG. 5, which are formed without the valve seat pockets 26 and 27, can be brought into operative connection with each other or are separable from each other to the same extent by the one-piece valve slide 8 or by the first valve slide part 81, as the case may be.

In principle, both the one-piece valve slide 8 and the first valve slide part 81 are spring-loaded in the direction of the first axial position corresponding with a first operating state of the parking brake valve 2, or applies a spring force of a spring force device 9 in these. In the first operating state of the parking brake valve 2 or in the first axial position of the one-piece valve slide 8 or the first valve slide part 81, as the case may be, corresponding to this, an actuating pressure pB, at which the parking brake is transferred into the engaged operating state, can be applied to the parking brake unit 6.

This results from the fact that the actuating pressure pB is applied in the area of a piston of a piston-cylinder unit of the parking brake unit. Thereby, the actuating pressure pB acts against a spring device engaging at the piston of the piston-cylinder unit, which subjects the piston and a piston rod in operative connection with it with an actuating force to such an extent that the piston and the piston rod along with a parking pawl in operative connection with them are transferred into an operating state engaging with a parking interlock gear. If the actuating pressure pB is greater than the spring force of the spring device of the piston-cylinder unit, the parking pawl is held out of engagement with the parking interlock gear by the actuating pressure pB. In contrast to this, the parking pawl is brought into engagement with the parking interlock gear by the spring device of the piston-cylinder unit if the actuating pressure pB is smaller than a minimum pressure value holding the parking brake in a disengaged operating state.

In addition, in the area of a control surface 10 of the one-piece valve slide 8 or the first valve slide part 81, as the case may be, a pressure signal pA acting in the direction of a second axial position of the one-piece valve slide 8 or the first valve slide part 81, respectively shown in FIG. 2 or in FIG. 5, corresponding with a second operating state of the parking brake valve 2 is connectable, in which, at the parking brake unit, an actuating pressure pB transferring the parking brake of the parking brake unit 6 into the disengaged operating state can be applied.

In the first axial position of the one-piece valve slide 8 or the first valve slide part 81, as the case may be, the valve seat pocket 23 or the supply pressure valve seat pocket, as the case may be, is connected to the valve seat pocket 22, which as a vent valve seat pocket is in connection with a low-pressure area 11 or a tank, as the case may be, of the automatic transmission. Thereby, the system pressure p_sys applied by an aperture 12 at the parking brake valve 2 is vented by the valve seat pockets 23 and 22 in the direction of the low-pressure area 11.

In the area of the valve seat pocket 24, which constitutes an actuating pressure valve seat pocket, both exemplary embodiments of the parking brake valve 2 shown in the drawing are connected to the parking brake unit 6. In the first axial position of the one-piece valve slide 8 or the first valve slide part 81, as the case may be, the actuating pressure valve seat pocket 24 is connected to the valve seat pocket 25 that in turn constitutes a vent valve seat pocket, which is coupled with the low-pressure area 11. Thereby, the actuating pressure pB is degraded or vented, as the case may be, both in the area of the parking brake valve 2 and in the area of the parking brake unit 6 in the direction of the low-pressure area 11, such that the parking brake is transferred by the spring device of the parking brake unit 6 into its engaged operating state.

In the normal mode of the hydraulic system 1, i.e. with a functioning power supply of the valve devices 3 through 5, and upon the presence of a corresponding request to disengage the parking brake of the parking brake unit 6, the pressure signal pA in the area of the valve device 3 is increased to a level at which the first valve slide part 81 or the one-piece valve slide 8, as the case may be, is transferred from the first axial position shown in FIG. 1 or FIG. 4, as the case may be, into the second axial position shown in FIG. 2 or FIG. 5, as the case may be, by the pressure signal pA against the spring force of the spring device 9.

Through the axial adjustment of one-piece valve slide 8 and the first valve slide part 81, both the connection between the actuating pressure seat pocket 24 and the vent seat pocket 25 and the connection between the supply pressure valve seat pocket 23 and the vent valve seat pocket 22 are separated, while the supply pressure valve seat pocket 23 and the actuating pressure valve seat pocket 24 are connected to each other. As a result, the actuating pressure pB increases and, with a correspondingly high system pressure p_sys, the parking brake is transferred into its disengaged operating state against the spring force of the spring device 9 of the parking brake unit 6. In addition, the actuating pressure pB of the parking brake valve 2 in accordance with FIG. 1 through FIG. 3 is applied in the area of the valve seat pocket 27 and thus at a further control surface 13 of the first valve slide part 81, by which a so-called "self-retaining" of the parking brake valve 2 in accordance with FIG. 1 through FIG. 3 is activated. The activated self-retaining leads to the fact that, even with a drop in the pressure signal pA, the first valve slide part 81 is held in the second axial position by the actuating pressure pB against the spring force of the spring device 9.

If, in turn, there is a corresponding request to engage the parking brake of the parking brake device 6, the first valve slide part 81 of the parking brake valve 2 is to be transferred into its first axial position. For this purpose, the valve device 5, which in turn is a pressure regulator with a rising characteristic, is correspondingly energized, and applies an additional pressure signal pMV in the area of an additional control surface 14. This leads to the fact that the second valve slide part 82 applies an actuating force guiding the second valve slide part 82 in the direction of the first valve slide part 81, and the first valve slide part 81 is transferred, together with the second valve slide part 82, in the direction of its first axial position. The parking brake valve 2 in accordance with FIG. 1 then features the operating state shown in FIG. 3, and the actuating pressure valve seat pocket 24 is in turn separated from the supply pressure valve seat pocket 23. By the vent valve seat pocket 25, the actuating pressure pB is degraded to the extent necessary for the engagement of the parking brake of the parking brake device 6. At the same time, the self-retaining of the parking brake valve 2 is eliminated, such that the first valve slide part 81 is held in its first axial position by the spring force of the spring device 9 with a correspondingly adjusted pressure signal pA, even if the additional pressure signal pMV is in turn equal to zero.

Since the spring device 9 is arranged between the two valve slide parts 81 and 82, with a correspondingly small additional pressure signal pMV, the second valve slide part 82 is transferred by the spring device 9 into the position shown in FIG. 1, while the first valve slide part 81 is still in its first axial position. This results from the fact that the second valve slide part 82 is spring-loaded by the spring device 9 in the direction of a stop 17, and is adjustable by the additional pressure signal pMV against the spring force of the spring device 9 in the direction of the first valve slide part 81.

In contrast to this, with the second exemplary embodiment of the parking brake valve 2 in accordance with FIG. 4 and FIG. 5, the additional pressure signal pMV is applied directly at the one-piece valve slide 8, in order to this transfer this from the second axial position into its first axial position against the pressure signal pA.

Upon a loss of the power supply of the hydraulic system 1, due to the rising characteristic of the valve devices 3 and 5, both the pressure signal pA and the pressure signal pMV drop to zero. At the same time, through the aperture 12, the maximum system pressure is applied at the parking brake valve 2. If, at the point in time at which the power supply of the hydraulic system 1 is lost, the one-piece valve slide 8 and the first valve slide part 81 are in the first axial position, the parking brake of the parking brake unit 6 remains in an engaged operating state. If, upon the presence of the one-piece valve slide 8 and the first valve slide part 81 in the second axial position, the power supply of the hydraulic system 1 is lost, the parking brake 6 is held by the self-retaining function of the parking brake valve 2 in a disengaged operating state as long as the system pressure p_sys applied at the parking brake valve 2 is sufficiently high that the one-piece valve slide 8 and the first valve slide part 81 is held in the second axial position by the actuating pressure pB against the spring force of the spring device 9. Only when the system pressure p_sys drops below the threshold is the one-piece valve slide 8 or the first valve slide part 81 transferred by the spring device 9 into the first axial position and the parking brake of the parking brake unit 6 transferred into the engaged operating state.

With the parking brake valve 2 in accordance with FIG. 4 and FIG. 5, the further control surface 13 corresponds to a differential surface between two control surfaces 15, 16 turned towards each other of the one-piece valve slide 8 of the parking brake valve 2, whereas the actuating pressure pB is applied at the additional control surface 13 with the parking brake valve 2 in accordance with FIG. 4 and FIG. 5 by the actuating pressure valve seat pocket 24 and the supply pressure valve seat pocket 23.

With both the parking brake valve 2 in accordance with FIG. 1 through FIG. 3 and the parking brake valve 2 in accordance with FIG. 4 and FIG. 5, the control surfaces 10, 13 and 14 are matched to one another in such a manner that, upon pressures pA, pB and pMV at the one-piece valve slide 8 or a first valve slide part 81 applied in the area of the control surfaces 10, 13 and 14 and corresponding to each other, an overall force component displacing the valve slide 8 or the first valve slide part 81 into its first axial position engages, by which it is ensured that the parking brake valve 2 can always be transferred into the operating state which the parking brake is transferred into the engaged operating state.

Modifications and variations can be made to the embodiments illustrated or described herein without departing from the scope and spirit of the invention as set forth in the appended claims.

REFERENCE SIGNS

1 Hydraulic system
2 Valve device, parking brake valve
3-5 Valve device
6 Parking brake unit
7 Valve housing
8 Valve slide
9 Spring device
10 Control surface
11 Low-pressure area
12 Aperture
13 Further control surface
14 Additional control surface
15, 16 Control surface
17 Stop
21 Valve seat pocket
22 Valve seat pocket, vent valve seat pocket
23 Valve seat pocket, supply pressure relief valve seat
24 Valve seat pocket, actuating pressure valve seat pocket
25 Valve seat pocket, vent valve seat pocket
26 Valve seat pocket
27 Valve seat pocket
28 Valve seat pocket
81 First valve slide part
82 Second valve slide part
pA Pressure signal
pB Actuating pressure
pMV Additional pressure signal
p_sys Supply pressure, system pressure

The invention claimed is:

1. A hydraulic system for an automatic transmission, comprising:
   a valve housing;
   a plurality of valves, one of the plurality of valves being a parking brake valve with a plurality of valve seat pockets formed proximate the valve housing;
   a hydraulically actuated parking brake unit, an actuating pressure of the parking brake unit being a function of a supply pressure applicable through the valve housing, a valve slide longitudinally adjustable in the valve housing between a first axial position and a second axial position such that the valve seat pockets of the plurality of valve seat pockets are selectively brought into operative connection with each other, the valve slide spring-loaded by a spring towards the first axial position that corresponds to a first operating state of the parking brake valve, the actuating pressure of the parking brake unit applied at the parking brake unit such that the parking brake unit is engaged when the parking brake valve is at the first operating state of the parking brake valve, the valve slide adjustable with a pressure signal at a control surface of the valve slide towards the second axial position of the valve slide that corresponds to a second operating state of the parking brake valve, the actuating pressure of the parking brake unit applied at the parking brake unit such that the parking brake unit is disengaged when the parking brake valve is at the second operating state of the parking brake valve,
   wherein the actuating pressure of the parking brake unit is also applicable at a first additional control surface of the valve slide such that a total actuating force applied to the valve slide acts towards the second axial position,
   wherein the valve slide is also adjustable with an additional pressure signal at a second additional control surface of the valve slide towards the first axial position of the valve slide,
   wherein the control surface of the valve slide, the first and second additional control surface of the valve slide and the spring of the parking brake valve are matched to one another such that the total actuating force applied to the valve slide displaces the valve slide to the first axial position when the actuating pressure of the parking brake unit, the pressure signal at the control surface of the valve slide and the additional pressure signal at the second additional control surface of the valve slide are applied.

2. The hydraulic system of claim 1, wherein the pressure signal is adjustable with one of the plurality of the valves, the one of the plurality of the valves formed as an electrically actuated pressure regulator such that the pressure signal increases with an increasing actuating current to the electrically actuated pressure regulator.

3. The hydraulic system of claim 2, wherein the pressure signal of the electrically actuated pressure regulator is operable to adjust an actuating pressure of at least one shift element of the automatic transmission, the actuating pressure dependent upon the supply pressure.

4. The hydraulic system of claim 1, wherein the additional pressure signal is adjustable with one of the plurality of the valves, the one of the plurality of the valves formed as an electrically actuated pressure regulator such that the pressure signal increases with an increasing actuating current to the electrically actuated pressure regulator.

5. The hydraulic system of claim 1, wherein a first one of the plurality of valve seat pockets is a supply pressure relief valve seat pocket and a second one of the plurality of valve seat pockets is a first vent valve seat pocket with a low-pressure area, the supply pressure applicable to the supply pressure relief valve seat pocket, the supply pressure relief valve seat pocket in fluid communication with the first vent valve seat pocket at least in the first axial position of the valve slide.

6. The hydraulic system of claim 5, wherein a third one of the plurality of valve seat pockets is an actuating pressure valve seat pocket and a fourth one of the plurality of valve seat pockets is a second vent valve seat pocket with a low-pressure area, the actuating pressure applicable to the actuating pressure valve seat pocket, the parking brake valve connected to the parking brake unit through the actuating pressure valve seat pocket, the actuating pressure valve seat pocket in fluid communication with the second vent valve seat pocket at least in the first axial position of the valve slide.

7. The hydraulic system of claim 6, wherein the supply pressure valve seat pocket is in fluid communication with the actuating pressure valve seat pocket at least in the second axial position of the valve slide, the supply pressure valve seat pocket disconnected from the first vent valve seat pocket in the second axial position of the valve slide, the actuating pressure valve seat pocket disconnected from the second vent valve seat pocket in the second axial position of the valve slide.

8. The hydraulic system of claim 6, wherein the valve slide comprises a first valve slide part and a second valve slide part, the first and second valve slide parts spaced from each other in an axial direction and arranged in the housing such that the first and second valve slide parts are longitudinally displaceable relative to each other, the spring arranged between the first and second valve slide parts, the control surface and the first additional control surface provided at the first valve slide part, the second additional control surface provided at the second valve slide part, the actuating pressure valve seat pocket and the supply pressure valve seat pocket separated from each other in the first axial position of the first valve slide part, the actuating pressure valve seat pocket connected to the second vent valve seat pocket in the first axial position of the first valve slide part, the supply pressure valve seat pocket connected to the first vent valve seat pocket in the first axial position of the first valve slide part, the actuating pressure valve seat pocket and the supply pressure valve seat pocket connected to each other in the second axial position of the first valve slide part, the actuating pressure valve seat pocket separated from the second vent valve seat pocket in the second axial position of the first valve slide part, the supply pressure valve seat pocket separated from the first vent valve seat pocket in the second axial position of the first valve slide part, the first valve slide part transferable by the second valve slide part into the first axial position of the first valve slide part.

9. The hydraulic system of claim 8, wherein the second valve slide part is spring-loaded by the spring towards a stop, the second valve slide part adjustable by the additional pressure signal against the spring towards the first valve slide part.

10. The hydraulic system of claim 1, wherein one of the plurality of valve seat pockets is connected to the actuating pressure of the parking brake unit such that the one of the plurality of valve seat pockets applies the actuating pressure of the parking brake unit at the first additional control surface of the valve slide.

11. The hydraulic system of claim 1, wherein one of the valve seat pockets is an actuating pressure valve seat pocket and the first additional control surface is a differential surface between two control surfaces of the valve slide, the two control surfaces of the valve slide turned towards each other, the actuating pressure applied at the first additional control surface and at the actuating pressure valve seat pocket.

* * * * *